United States Patent Office 3,551,495
Patented Dec. 29, 1970

3,551,495
POLYMERIC AMINES
Gerhard H. Alt, Creve Coeur, Mo., and Robert J. Strelau, West Palm Beach, Fla., assignors to Monsanto Company, St. Louis, Mo., a corporation of Delaware
No Drawing. Filed Dec. 4, 1967, Ser. No. 687,427
Int. Cl. A23k 1/00; C07c 85/12, 87/20
U.S. Cl. 260—583                                        11 Claims

ABSTRACT OF THE DISCLOSURE

Polymeric amines possessing in excess of approximately 60% tertiary groups, are prepared by the catalytic hydrogenation of a dinitrile or a mixture of a dinitrile and hexamethyleneimine. The polymeric amines have an amine number of 435–465 and the approximate ranges of primary, secondary and tertiary amines in the polymer are 0.1 to 10%, 25–38% and 60–65% respectively.

These polymeric amines have utility as feed additives.

---

This invention relates to polymeric amines and their preparation by the catalytic hydrogenation of either a dinitrile or a mixture of dinitrile and a cyclic amine.

Catalytic hydrogenation of dinitriles to yield amines is known in the art. If the hydrogenation is conducted in the presence of ammonia, the main product obtained is the diamine. The reduction in the absence of ammonia by previously known methods yielded a polymeric secondary amine which was then alkylated to form a polymeric tertiary amine.

It has now been found that polymeric tertiary amines can be formed directly by the catalytic hydrogenation of either a dinitrile or a mixture of dinitrile and a cyclic imine. In this procedure the cumbersome step of alkylation of a polymer is avoided.

In general the polymeric tertiary amine compounds of this invention are prepared by the catalytic hydrogenation, at elevated temperatures and pressures, of either dinitriles or a mixture of dinitriles and cyclic imines according to the following equations:

(a) $$NCRCN + H_2 \xrightarrow{\text{Catalyst}} \text{polymeric tertiary amine}$$

(b)
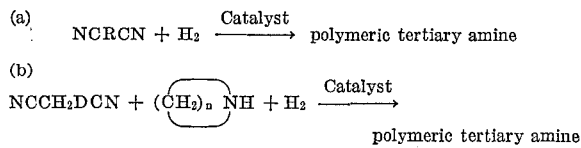

polymeric tertiary amine wherein D is divalent aliphatic of not more than 10 carbon atoms selected from the group consisting of alkyl, alkenyl and alkynyl; $n$ is an integer from 4 to 7, inclusive; and R is a linear divalent aliphatic having 4 or 5 carbon atoms selected from the group consisting of alkyl, alkenyl and alkynyl.

Preferred starting dinitriles, in Equation b, are those in which D has at least 1 and not more than 4 carbon atoms and in which there is a maximum of two unsaturated carbon-carbon linkages. This includes, but is not limited to succinonitrile, glutaronitrile, adiponitrile, pimelinitrile, fumaroylnitrile, glutaconylnitrile, 1,4-dicyanobut-2-ene, 1,4-dicyanobut-1-ene, and 1,4-dicyanobutyne-1.

The starting dinitriles and cyclic imines should be essentially pure components for maximum yield and avoidance of poisoning of the catalyst. Purification of the starting reactant is by conventional means based on its physical properties.

The preferred catalyst is Raney nickel. However, any nitrile hydrogenation catalyst, such as copper-chromite, Raney cobalt, platinum, palladium, palladium on charcoal, platinum on charcoal, nickel on kieselguhr, copper-nickel carbonate, cadmium-copper-zinc chromite, copper-nickel oxide and the like can be used. Nickel catalysts are commercially available or are prepared according to conventional methods.

The amount of nickel catalyst employed in the reaction is not critical, but normally is in the approximate range of 1 to 10% by weight based on the total nitrile or nitrile-cyclic imine charge. The preferred amount of catalyst is approximately 1 to 3% by weight. The amount of catalyst, other than the nickel catalyst, utilized varies slightly from the above preferred range depending upon the catalyst chosen but will still be within the 1 to 10% by weight. Amounts above and below this range can be utilized, but the economics of the catalyst system does not warrant any great deviation from the approximate range of 1 to 10%.

Preparation of the dinitrile and cyclic imines are by known methods. Dinitriles are prepared by dehydration of amides; reaction of halides with sodium cyanide; heating of an acetylenic diiodide and an alkali cyanide in aqueous acetone or with cuprous cyanide in xylene.

Cyclic imines are generally prepared by reduction of the corresponding heterocyclic compound or cyclization of dihalides with ammonia.

Hydrogenations in accordance with this invention are normally conducted at pressures within the approximate range of 75 to 250 atmospheres. Pressures above 250 atmospheres can be used without any deleterious effects on the polymer, but such pressures are not necessary. The reactor is raised to these pressures at room temperature. The pressure therefore increases as the reaction temperature increases. The increase in pressure however is not directly related to the increase in temperature as would be expected. As the temperature increases, the reaction is initiated causing a decrease in the moles of reactants present. This decrease in the moles of reactants will counterbalance, to some extent, the increase in pressure due to temperature rise.

The initial hydrogenation reaction is exothermic causing an immediate rise in temperature. One of the by-products of this reaction is ammonia. The ammonia is vented periodically during the hydrogenation to prevent a large build-up of ammonia with a corresponding decrease in polymer formation. The first venting, to about half the recorded pressure, is after the exothermic reaction has subsided. This is followed by repressurizing, with hydrogen, to the original pressure. Each venting is followed by the addition of hydrogen until the original pressure is reached.

Preferred pressures vary and are dependent upon the nature of the starting materials. Reactions of alkyl dinitriles are conducted in the approximate range of 100–150 atmospheres. Reductions of alkenyl and alkynyl dinitriles usually require higher pressures dependent upon whether or not the unsaturated carbon-carbon linkage is conjugated with the nitrile group. Hydrogenation of unsaturated dinitrile compounds usually requires pressures in the approximate range of 125 to 200 atmospheres.

Hydrogenation temperatures are normally in the approximate range of 150–275° C. with the preferred range being 200–250° C.

Polymeric tertiary amines formed by this procedure have an amine number in the approximate range of 435 to 465. Amine number is defined as milligrams of potassium hydroxide required to neutralize one gram of sample.

The average approximate percentage of primary, secondary and tertiary nitrogen atoms present in the polymer, based on total nitrogen atoms, is 0.1 through 10%, 25 through 38% and 60 through 65% respectively. The average molecular weight of the polymer varies dependent upon length of hydrogenation, pressure, temperature and reactants. Following the present procedure, average molecular weights of approximately 750 to 2000 have been obtained, with the usual range being approximately 1000 to 1300.

Theoretically, no excess of hydrogen should be required for complete reaction, however, a large initial excess, 50 to 100% excess, is usually used. Having an excess of hydrogen ensures completion of reaction. Part of the available hydrogen is lost during the venting of the ammonia from the reaction vessel. This loss in hydrogen is compensated by the addition of hydrogen, after each venting of ammonia, until the original pressure is reached.

The reaction is usually run in the absence of a solvent. Solvents unreactive to hydrogenation, reaction with nitriles or cyclic imines, or to poisoning of the catalyst can be used if desired, however, use of a solvent may reduce the molecular weight of the polymer. Suitable solvents include, but is not limited to saturated hydrocarbons such as hexane and heptane and the like, alcohols such as methanol, ethanol, n-propanol and the like, and cyclic ethers such as dioxane and the like. In order to ensure that the initial pressure represents a 50 to 100% excess of hydrogen, the reaction pressure *must* be increased to compensate for the presence of a solvent. This increase in pressure can easily be calculated, according to the gas laws, from the solvent nature and quantity.

The following examples are illustrative only and should not be construed as limiting the invention. In these examples and throughout the specification, all proportions are expressed in parts by weight unless otherwise indicated.

EXAMPLE 1

To a suitable pressure vessel was charged 108.2 parts adiponitrile, 99.2 parts hexamethyleneimine and 3.8 parts nickel catalyst (Ni0104P, Hawshaw Co., contains 58% nickel on kieselguhr with a ratio of reduced nickel to total nickel of 0.60–0.65). Hydrogen was added to a total pressure of 2250 p.s.i.g. (pounds per square inch gauge). The reactor was then heated to a temperature of about 250° C. An exothermic reaction occurred within the temperature range of 110 to 140° C. This exothermic reaction was accompanied by a decrease in pressure. Following the exothermic reaction the vessel was vented to remove part of the ammonia formed during the reaction. The temperature was then increased to 250° C. and maintained at this temperature for about 8 hours. The vessel was vented at about 2 hour intervals. Upon completion of reaction, the vessel was vented and pressure reduced to atmospheric pressure. The vessel contents were then filtered. The filtrate was distilled, collecting the portion distilling up to 220° C./0.2 mm. The polymer had the following properties: average molecular weight 1067–1096; amine number 447; primary nitrogen 1.5%; secondary nitrogen 36.8%; tertiary nitrogen 61.7%; glass transition point −47.5.

EXAMPLES 2 TO 4

The procedure of Example 1 was substantially repeated. The following polymers were obtained:

|  | 2 | 3 | 4 |
|---|---|---|---|
| Average molecular weight | 1,150–1,190 | 1,110–1,130 | 1,052–1,085 |
| Amine number | 444 | 465 | 452 |
| Primary nitrogen, percent | 2.9 | 6.5 | 5.3 |
| Secondary nitrogen, percent | 34.0 | 32.2 | 34.5 |
| Tertiary nitrogen, percent | 63.1 | 63.1 | 60.2 |
| Glass transition temp., °C. | −44.0 | | |
| Catalyst | (1) | (2) | (1) |
| Temperature, °C. | 225 | 275 | 250 |

[1] Raney nickel.
[2] Copper chromite.

EXAMPLES 5 AND 6

The procedure of Example 1 was repeated with the exception that glutaronitrile and pentamethyleneimine (piperidine) were used as the dinitrile and cyclic imine respectively. The polymeric amines obtained were within the range as previously obtained with adiponitrile and hexamethyleneimine.

EXAMPLES 7 TO 10

To a suitable pressure vessel was charged adiponitrile (230 parts) and Raney nickel (4.3 parts) and the hydrogen added to 2000 and 2600 p.s.i.g. The contents were heated to 225–275° C. and this temperature range maintained for 8 hours. The vessel was vented twice during the 8 hour period. Additional dinitrile (116 parts) and catalyst (2.2 parts) was added after each 8 hour period and the procedure repeated two more times. The following polymers were obtained:

|  | 7 | 8 | 9 | 10 |
|---|---|---|---|---|
| Average molecular weight | 1,300–1,315 | 1,000–1,035 | 1,000–1,010 | 1,040–1,065 |
| Amine number | 443 | 442 | 456 | 437 |
| Primary nitrogen, percent | 3.7 | 1.0 | 6.0 | 5.8 |
| Secondary nitrogen, percent | 33.0 | 35.9 | 29.8 | 30.9 |
| Tertiary nitrogen, percent | 63.3 | 63.1 | 64.2 | 63.3 |

EXAMPLE 11

The procedure of Examples 7 through 10 was repeated using fumaroylnitrile in place of adiponitrile and palladium on charcoal in place of Raney nickel. The pressure was 2700 p.s.i.g. and temperature was 275° C. The polymer obtained was within the range obtained by the procedure of Example 7.

The polymeric amines of this invention are useful as animal feed additives to stimulate growth. In in vitro experiments, the compounds of this invention gave a propionate response of 136 to 142% of the control. These results were also obtained in in vivo experiments in which the compounds of this invention were fed to sheep at a rate of 25 milligrams of compounds per kilogram of diet. The average gain, in kilograms, over a 42-day period for the sheep fed the test compounds was 7.9 to 9.0 as compared to 7.6 for the control sheep.

The compounds are added to conventional feed at an approximate rate of 125 to 100 mgm. per kilogram of feed. Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal, and the like plant products. Most ruminant feed rations also contain up to about 2 percent mineral ingredients such as bone meal, limestone, salt and the various trace minerals including salts of zinc, copper, manganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamin A, $B_{12}$, D, K, riboflavin, niacin, pantothenic acid or salts thereof, choline, pyridoxine, thiamine, nicotinic acid or salts thereof, biotin, folic acid and the like; amino acids such as methionine, phenyl alamine, arginine, glycine, histidine, isoleucine and the like; medicaments such as antibiotics, steroids, arsenicals, anthelmintics and the like and antioxidants such as 6-ethoxy-2,2,4-trimethyl-1,2-dihydroquinoline, butylated hydroxy anisol and the like.

In addition to adding the polymeric amines to the feed, the polymeric amines can also be orally administered to the animal in the form of tablets, capsules, powders, solutions or suspensions.

While the illustrative embodiments of the invention have been described hereinbefore with particularity, it will be understood that various modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A polymeric amine having an amine number in the approximate range of 435 to 465 and consisting of 0.1 through 10% primary nitrogen atoms; about 25 through 38% secondary nitrogen atoms and 60 through 65% tertiary nitrogen atoms; prepared by the catalytic hydrogenation at a pressure from about 75 to about 250 atmospheres and a temperature from about 150 to about 275° C. of a composition selected from the group consisting of
   (a) a dinitrile of the formula NCRCN and
   (b) a mixture of NC—CH$_2$DCN and a cyclic imine having 5 to 8 members, inclusive
while periodically venting by-product ammonia, wherein D is divalent aliphatic of not more than 10 carbon atoms selected from the group consisting of alkyl, alkenyl and alkynyl, and R is a linear divalent aliphatic having 4 or 5 carbon atoms selected from the group consisting of alkyl, alkenyl and alkynyl.

2. A polymeric amine in accordance with claim 1, in which the polymeric amine is prepared from composition (a).

3. A polymeric amine in accordance with claim 2, in which R is divalent aliphatic of 4 carbon atoms and in which the alkenyl and alkynyl have a maximum of two carbon-carbon unsaturated linkages.

4. A polymeric amine, in accordance with claim 3, in which the dinitrile is an alkyl dinitrile.

5. A polymeric amine, in accordance with claim 4, in which the alkyl dinitrile is adiponitrile.

6. A polymeric amine, in accordance with claim 1, in which the amine is prepared from composition (b).

7. A polymeric amine in accordance with claim 6, in which D is divalent aliphatic of not more than 4 carbon atoms and in which the alkenyl and alkynyl have a maximum of two carbon-carbon unsaturated linkages.

8. A polymeric amine in accordance with claim 7 in which the cyclic imine is hexamethyleneimine.

9. A polymeric amine in accordance with claim 8 in which the nitrile is an alkyl dinitrile.

10. A polymeric amine in accordance with claim 9 in which the alkyl dinitrile is adiponitrile.

11. A polymeric amine in accordance with claim 1 in which the amine has a molecular weight in the approximate range of 1000 to 1350.

References Cited
UNITED STATES PATENTS

| | | | |
|---|---|---|---|
| 3,152,185 | 10/1964 | Zvejnieks | 260—583(K) |
| 3,217,028 | 11/1965 | Vertnik | 260—583(K)X |

CHARLES B. PARKER, Primary Examiner

R. L. RAYMOND, Assistant Examiner

U.S. Cl. X.R.

99—2; 260—563; 424—78